United States Patent [19]

Waynant et al.

[11] Patent Number: 4,513,424
[45] Date of Patent: Apr. 23, 1985

[54] LASER PUMPED BY X-BAND MICROWAVES

[76] Inventors: Ronald W. Waynant, 13101 Claxton Dr., Laurel, Md. 20708; Leonard Epp, Box 192, Gallant-Green Rd., Waldorf, Md. 20601; Clad P. Christensen, Jr., 2233 Arlington Ter., Alexandria, Va. 22303

[21] Appl. No.: 420,990

[22] Filed: Sep. 21, 1982

[51] Int. Cl.³ .......................... H01S 3/09; H01S 3/23
[52] U.S. Cl. ........................................ 372/68; 372/57; 372/69; 372/81
[58] Field of Search ....................... 372/69, 70, 72, 73, 372/74, 92, 57, 81, 82, 83, 68

[56] References Cited

U.S. PATENT DOCUMENTS

| | | | |
|---|---|---|---|
| 3,393,372 | 7/1968 | Vickery et al. | 331/94.5 |
| 3,521,119 | 7/1970 | Ahmed et al. | 331/94.5 |
| 3,564,449 | 2/1971 | Muller et al. | 331/94.5 |
| 3,602,837 | 8/1971 | Goldsborough | 331/94.5 |
| 3,748,594 | 7/1973 | Pugh | 331/94.5 |
| 3,753,152 | 8/1973 | Pettipiece | 331/94.5 |
| 3,961,283 | 6/1976 | Abrams et al. | 331/94.5 C |
| 4,004,249 | 1/1977 | Kikuchi | 372/58 |
| 4,169,251 | 9/1979 | Laakmann | 372/82 |

OTHER PUBLICATIONS

Lachambre, Macfarlane, Otis, Lavigne, "A Transversely RF-Excited CO₂ Waveguide Laser", Appl. Phys. Lett. 32(10), May 15, 1978, pp. 652–653.

Mendelsohn et al., "A Microwave-Pumped Xecl* Laser", Appl. Phys. Lett. 38(8), Apr. 15, 1981, pp. 603–605.

Riblet et al., "A New Type of Waveguide Directional Coupler", Proceedings of the I.R.E., vol. 36, 1948, pp. 61–63.

*Primary Examiner*—James W. Davie
*Attorney, Agent, or Firm*—Robert F. Beers; William T. Ellis; John L. Forrest

[57] ABSTRACT

A laser device pumped by RF microwaves at frequencies in the range of 8 to 12 GHz (X-band). An optical cavity containing a lasing medium is located within an RF cavity resonant at a frequency in the X-band. X-band RF energy is supplied from an RF source to a waveguide. A coupling plate, forming a common wall between the waveguide and the RF cavity, couples the RF energy from the waveguide into the cavity to produce a standing wave pattern therein which excites the lasing medium. Various coupling plate designs are disclosed. In an alternative embodiment, a plurality of separate optical cavities containing separate lasing media are located within the RF cavity and are commonly excited by the microwave energy.

5 Claims, 6 Drawing Figures

LASER PUMPED BY X-BAND MICROWAVES

BACKGROUND OF THE INVENTION

The present Invention relates, in general, to a novel laser device wherein the laser medium is pumped by microwave RF excitation at frequencies in the range of 8 to 12 GHz (X-band).

Radio-frequency sources in the 1 to 30 MHz frequency range have been used in prior art pumping systems for exciting mixtures of gases to generate lasing. Such systems typically utilize inductive or capacitive coupling to couple the RF energy into the lasing medium. U.S. Pat. No. 3,521,119 to AHMED is an example of one type of inductively coupled RF pumped laser while U.S. Pat. No. 3,748,594 to PUGH illustrates a capacitivety coupled system.

These prior art systems generally are incapable of coupling significant amounts of the RF energy into the lasing medium and thus tend to be rather inefficient. Also, these systems typically radiate significant amounts of RF energy which presents obvious radio frequency interference problems (RFI) and the resultant necessity for expensive and bulky shielding. Another problem with these systems is that they require metallic electrodes, sometimes in contact with the lasing medium, to couple the RF energy to the medium. Since many lasing media are extremely corrosive, the use of the electrodes severely limits the available lasing media to those which are the least corrosive. Also problems exist due to contamination of the lasing media by the electrodes.

Microwave excitation laser systems are known in the prior art. These systems have operated with frequencies of up to about 3 GHz. Efficiency and coupling problems exist with these devices necessitating the use of external fields and/or usual geometries. For example U.S. Pat. No. 3,602,837 to GOLDSBOROUGH discloses a microwave excited laser device wherein RF energy is supplied to a conductive band wrapped about a plasma tube located within an external magnetic field. The RF energy and the external field combine to produce standing waves within the lasing medium. U.S. Pat. No. 4,004,249 to KIKUCHI discloses a laser device wherein an optical waveguide is located within a microwave waveguide. The microwave waveguide includes a tapered "throat" portion in the vicinity of the optical waveguide which acts to concentrate the electric field within the optical waveguide.

The present Invention provides a novel microwave excited laser device which operates at X-band RF frequencies (8-12 GHz) and which does not require the use of external fields or complicated geometries. The device does not require the use of electrodes and thus avoids the problems inherant with the use of electrodes. Very high coupling efficiencies are obtained.

SUMMARY OF THE INVENTION

Accordingly, one object of the present Invention is to provide a novel laser device wherein a lasing medium is pumped by X-band microwave RF energy.

Another object is to provide a novel laser device which is pumped by RF energy and which does not require the use of electrodes.

Another object is to provide a novel RF pumped laser device which exhibits high RF coupling efficiency.

Still another object is to provide a novel RF pumped laser device wherein substantially all of the RF energy is contained within the system.

Yet another object is to provide a novel RF pumped laser device which is useable with any gaseous lasing medium.

Another object is to provide a novel RF pumped laser device which is useable with corrosive lasing media.

Yet another object is to provide a novel RF pumped laser device wherein multiple lasing media may be pumped simultaneously.

These and other objectives are provided by a novel RF microwave pumped laser device which includes a source of RF microwave radiation. An RF cavity resonant at the frequency of the output of the RF source receives the radiation from the source and produces a standing wave pattern in response to the RF energy. The RF energy is coupled into the cavity via a coupling means. At least one laser tube containing a lasing medium is at least partially contained within the RF cavity wherein the lasing medium is excited by the RF standing wave pattern.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
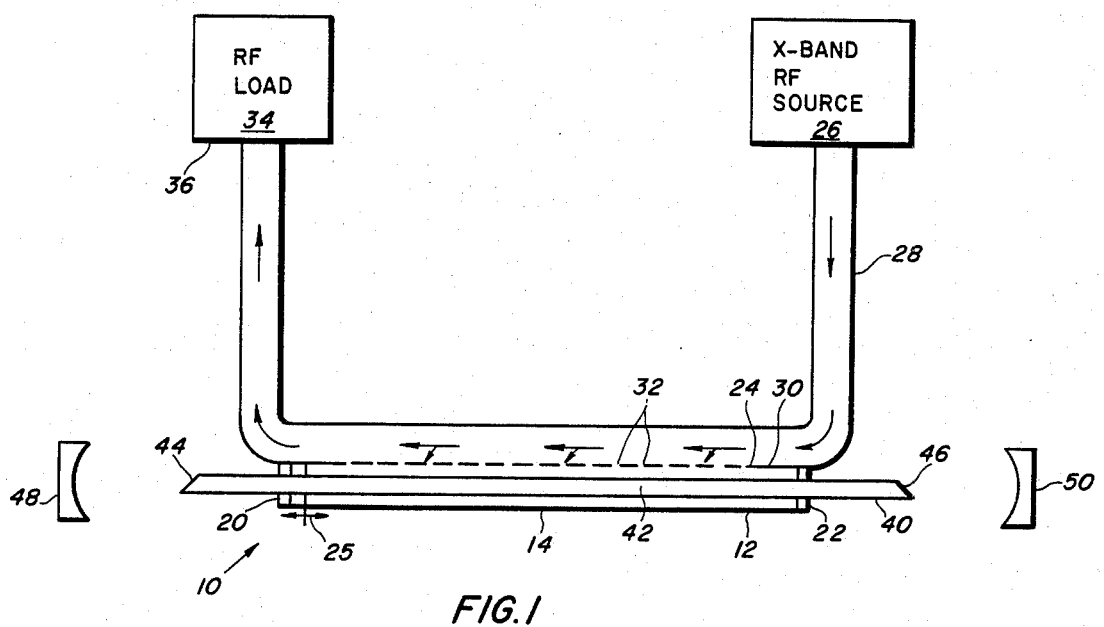
FIG. 1 illustrates a preferred embodiment of a laser device according to the present Invention.

Referring now to the drawings, wherein like reference numerals designate identical or corresponding parts throughout the several views, and more particularly to FIG. 1 thereof, a laser device 10 according to the present Invention is illustrated as including a resonant structure or RF cavity 12 which is resonant at a frequency in the X-band (8-12 GHz).

The RF cavity 12 includes a side plate 14 and top and bottom plates 16 and 18, respectively, (not illustrated) which are made from highly conductive materials, such as copper or brass. The RF cavity 12 additionally includes first and second end caps 20 and 22, respectively, and a side coupler plate 24, also made from highly conductive material. The coupler plate 24 will be described in detail below.

The dimensions of the RF cavity 12 should be of minimum cross-section for the propagation of the RF pumping wavelength and have a length equal to a multiple of one half of the microwave wavelength. The maximum length of the RF cavity 12 is limited by the available RF power supplied to the cavity as will be described below. A larger cross-section may be appropriate under certain circumstances as will be described below.

The RF cavity 12 further includes a sliding short plate 25 which may be moved back and forth in the directions of the arrows so as to fine tune the cavity to the excitation wavelength. Other tuning means can be used as should be obvious to the skilled practitioner.

Microwave cavity design is well known in the art and thus will not be further described in detail herein. In a preferred embodiment, the RF cavity 12 had a cross-section of 1.25 cm×2.5 cm and a length ranging between 30 and 70 cm, depending upon the actual excitation wavelength and the Rf signal power available.

X-band RF excitation is fed to the RF cavity 12 from an RF source 26 via a waveguide 28 which is sized appropriately for the transmission of X-band microwaves as is well known in the art. A commercially available microwave generator can be utilized as the RF source 26. For example the Inventors used a Varian Model #BLM-303B microwave source operating at a frequency of 9.3 GHz providing a peak RF power of 1.5 megawatts.

The RF cavity 12 is located tangent to a side portion 30 of the waveguide 28 and is in contact therewith such that the coupler plate 24 forms a common wall between the RF cavity and the waveguide in the area of contact. The coupler plate 24 is preferably removable so as to be interchangeable and includes a plurality of openings 32 in its surface through which substantially all of the microwave radiation traveling in the waveguide 28 is coupled into the RF cavity 12 so as to produce standing waves therein, as will be described in greater detail below. Only a representative portion of the openings 32 are shown in FIG. 1 for purposes of illustration.

An RF load 34, of appropriate impedance and power rating, is coupled to the output end 36 of the waveguide 28. The load 34 provides an appropriate impedance match for the RF source 26 and acts to absorb any excess microwave radiation which is not coupled into the RF cavity 12. The load 34 additionally acts to "seal" the system thereby preventing any substantial leakage of microwave radiation into the area surrounding the laser system. The RF load 34 is a standard commercial product and thus will not be described further herein.

An optical cavity or laser tube 40 passes through appropriate openings in the end caps 20, 22 and in the sliding short plate 25 such that most of the laser tube is located within the RF cavity 12. The laser tube 40 encloses the lasing medium 42 which is subjected to the RF standing waves within the RF cavity 12. Optical energy developed within the lasing medium 42 due to lasing action exits the laser tube 40 via a pair of Brewster angle windows 44 and 46, respectively, located at the ends of the laser tube 40. Mirrors 48 and 50 are located external to and at each end of the laser tube 40 to receive the optical energy passing through the Brewster angle windows 44 and 46 and to reflect the energy back into the laser tube, as is well known in the art.

In general, the laser tube 40 is preferably longitudinally positioned within the RF cavity 12 as illustrated such that the maximum possible quantity of lasing medium 42 contained therein is exposed to the RF standing waves. Under some circumstances, it may be advantageous to otherwise orient the laser tube within the RF cavity 12, as should be apparent to the skilled practitioner.

Additionally, the laser tube 40 is preferably centered within the cross-section of the RF cavity 12 so as to expose the lasing medium 42 to the maximum RF field within the cavity. Alternatively, the laser tube 40 can be replaced by a plurality of separate laser tubes (not illustrated) located within the RF cavity 12, each containing a separate lasing medium. Thus multiple laser pulses at various wavelengths can be simultaneously produced by simultaneously pumping various isolated lasing media by a common RF microwave source.

In the preferred embodiment of FIG. 1, optical feedback is provided by mirrors 48 and 50. Other feedback means are, of course, possible. For example, distributed feedback from the periodic gain of the lasing medium could be utilized thus allowing for the elimination of one or both feedback mirrors. This would be useful in the extreme or vacuum ultraviolet (VUV) regions of the electromagnetic spectrum where many lasers are theoretically possible, but where substrates and mirror surfaces do not allow transmission or reflection.

As previously described, the coupler plate 24 acts to couple essentially all of the RF energy available from the RF source 26 into the RF cavity 12. This being the case, the maximum length of the RF cavity 12 is limited by the maximum RF power available from the source 26. If the length of the cavity is too long in relation to the maximum available RF power, the entire RF cavity 12 will be insufficiently excited and thus the RF field produced by the standing waves in the cavity will not attain a sufficient level of pumping to create a lasing medium 42.

FIGS. 2-6 illustrate various preferred embodiments of the coupler plate 24 according to the present Invention. In each of these preferred embodiments, the coupler plate 24 is assumed to have the overall dimensions of 2.54 cm×31 cm. Other sized plates would, of course, be appropriate for use with larger or smaller RF cavities, as should be apparent to those of skill in the art. In each of the FIGS. 2-6, only a representative sample of the plurality of openings 32 are shown for illustrative purposes.

Figure 2:
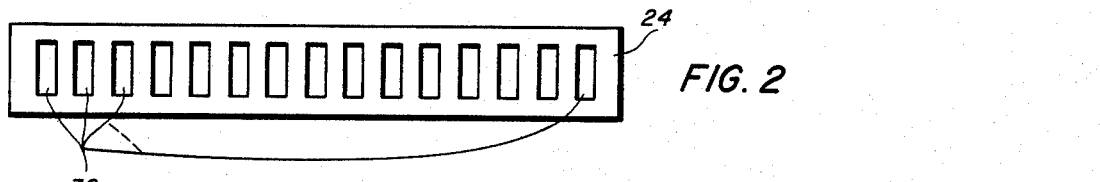
FIGS. 2 through 6 illustrate various coupling plates utilized in the laser device illustrated in FIG. 1.

In FIG. 2, a plurality of equal sized rectangular slots 32a are evenly spaced in a row across the length of the coupling plate 24. Each of the slots is oriented normal to the longitudinal axis of the coupling plate. In a practical embodiment, 38 slots each having the dimensions of 3 mm×1 cm were used.

Figure 3:
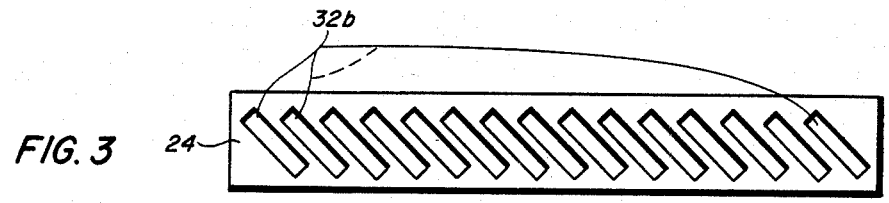
Figure 4:
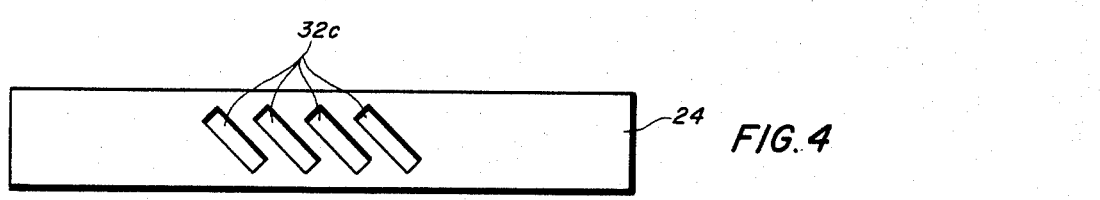

In FIG. 3, a plurality of equal sized rectangular slots 32b are evenly spaced in a row across the length of the coupling plate 24. Each of the slots is oriented at an angle (preferably 45°) with respect to the longitudinal axis of the coupling plate 24. In a practical embodiment, 19 slots each having the dimensions of 3 mm×1 cm were used. Similarly, in the embodiment of FIG. 4, only 4 slots 32c are used.

Figure 5:
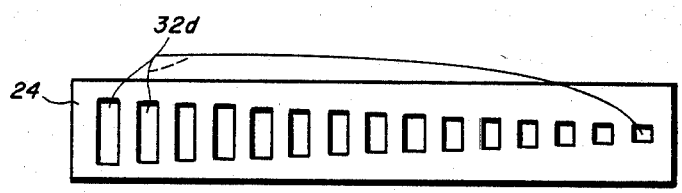

In FIG. 5 a plurality of rectangular slots 32d are evenly spaced in a row across the length of the coupling plate 24. Each of the slots 32d is oriented normal to the longitudinal axis of the coupling plate 24. The slots 32d are uneven in length with the length varying linearly across the length of the coupling plate. In a practical embodiment, 38 slots 3 mm wide and varying in length from a maximum of 1 cm to a minimum of approximately 3 mm were used.

Figure 6:
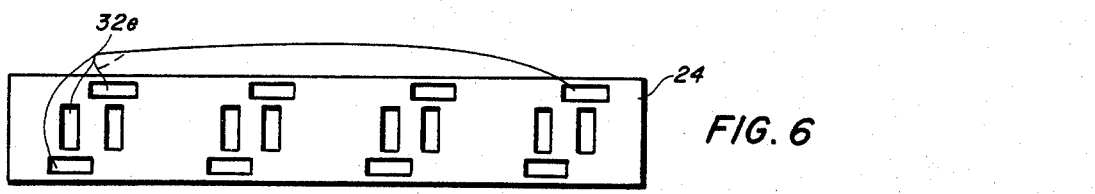

In FIG. 6, a plurality of equal sized rectangular slots 32e are grouped together in arrays of four slots as shown. The arrays are arranged in a row across the length of the coupling plate 24. In a practical embodiment, 13 arrays were used with each slot measuring 3 mm×1 cm.

The laser device of the present Invention can be used to pump any gaseous lasing medium. In practical embodiments, the present Inventors used a mixture of 99.6% Ne, 0.3% Xe, and 0.1% $NF_3$ to produce a laser pulse from XeF* at 353 nm. A mixture of 99.6% Ne, 0.3% Xe, and 0.1% HCl should produce a laser pulse from XeCl* at 308 nm. A mixture of 0.01 mg of $HgBr_2$ in 50 Torr. of $N_2$ and 710 Torr. of Ne heated in an oven between 150° and 200° C. should produce a laser pulse from HgBr* at 502 nm. The present Invention should not be considered to be limited to the specific lasing media listed herein.

The laser device of the present Invention provides numerous advantages over prior art systems. The device is useable with any gaseous lasing medium or mixture of laser gases including corrosive gases. No electrodes are required and thus electrode corrosion and electrode contamination problems are eliminated. Most of the microwave energy (80-90%) is coupled into the discharge thus providing a high pumping efficiency. Due to the closed RF signal path, substantially all of the RF energy is contained within the system thereby eliminating RFI problems. Numerous other advantages will of course be obvious to the skilled practitioner.

Obviously, numerous (additional) modifications and variations of the present Invention are possible in light of the above teachings. It is therefore to be understood that within the scope of the appended claims, the Invention may be practiced otherwise than as specifically described herein.

What is claimed as new and desired to be secured by Letters Patent of the United States is:

1. In an RF microwave pumped laser device comprising:
   an RF microwave source, said source producing microwave output radiation in the frequency range of 8 to 12 GHz;
   cavity means resonant at the frequency of said microwave output radiation of said source for receiving said microwave radiation and for producing a standing wave pattern therein in response thereto;
   waveguide means for transmitting said microwave radiation from said source to said cavity means;
   coupling means for coupling said microwave radiation from said waveguide means into said cavity means, said coupling means including a coupling plate forming a common wall between a portion of said waveguide means and a portion of said cavity means, said coupling plate including a plurality of openings therein through which said microwave radiation passes;
   a plurality of laser tubes each containing a laser medium different from that contained in the remainder of said plurality of laser tubes, at least a portion of each of said plurality of laser tubes being located within said cavity means, each laser medium within each of said plurality of laser tubes being excited by said standing wave pattern; and
   feedback means associated with said laser tubes for receiving optical radiation produced by said excited lasing mediums and for redirecting said optical radiation back into said lasing mediums.

2. The RF microwave pumped laser device as recited in claim 1, wherein said plurality of openings in said coupling plate includes a plurality of rectangular openings distributed in a row across the length of said coupling plate.

3. The RF microwave pumped laser device as recited in claim 2, wherein all of said rectangular openings are unequal in length, each rectangular opening being oriented normal to the longitudinal axis of said coupling plate.

4. The RF microwave pumped laser device as recited in claim 2, wherein all of said rectangular openings are equal in size, each rectangular opening being oriented at a common angle not equal to zero or ninety degrees taken with respect to the longitudinal axis of said coupling plate.

5. The RF microwave pumped laser device as recited in claims 4 which further comprises:
   an RF load coupled to an output port of said waveguide means, said load providing an impedance match for said source means and acting to absorb any excess radiation in said waveguide means which is not coupled into said cavity means.

* * * * *